March 3, 1964 — M. ROCHLIN — 3,123,656

METHOD FOR FINISH SHAPING FOAMED PLASTIC

Filed Feb. 9, 1962 — 2 Sheets-Sheet 1

INVENTOR.
MORRIS ROCHLIN
BY Cullen & Cantor
ATTORNEYS

March 3, 1964 M. ROCHLIN 3,123,656
METHOD FOR FINISH SHAPING FOAMED PLASTIC
Filed Feb. 9, 1962 2 Sheets-Sheet 2
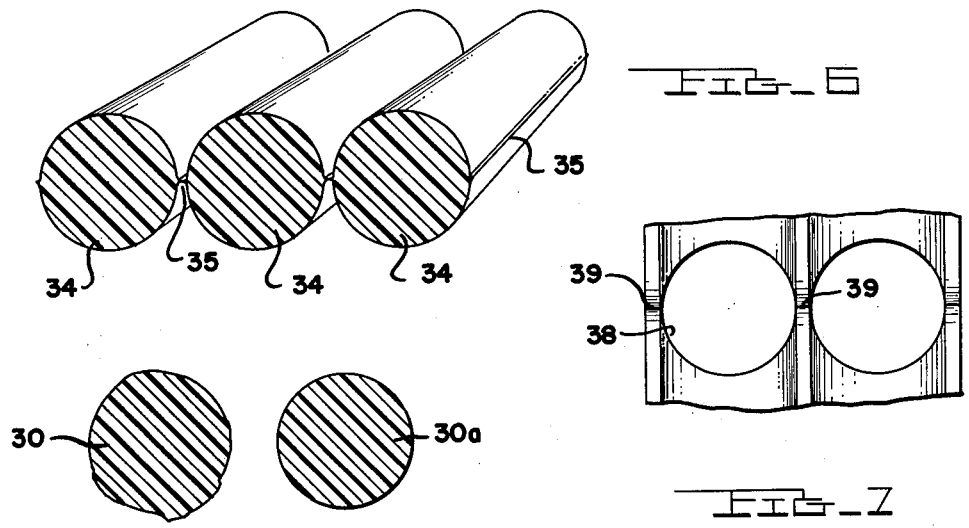
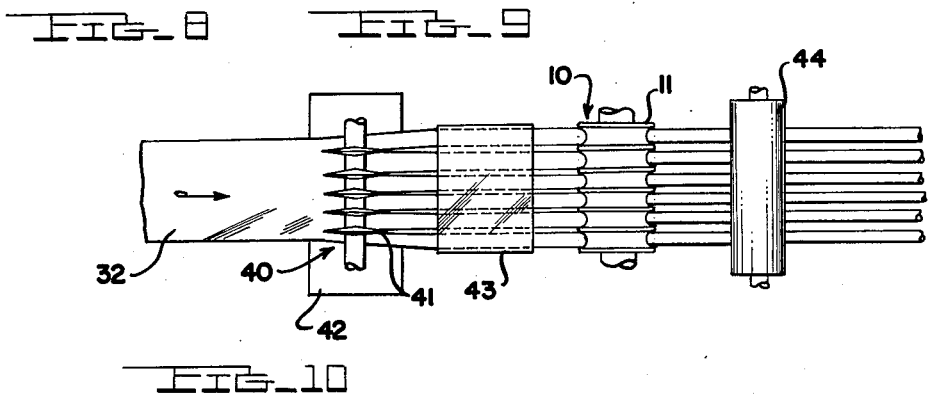
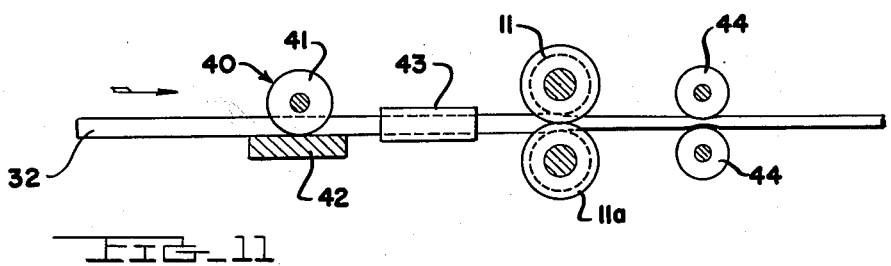
INVENTOR.
MORRIS ROCHLIN
BY
Cullen & Cantor
ATTORNEYS United States Patent Office 3,123,656
Patented Mar. 3, 1964

3,123,656
METHOD FOR FINISH SHAPING
FOAMED PLASTIC
Morris Rochlin, Oak Park, Mich., assignor to
Foamade Industries, Oak Park, Mich.
Filed Feb. 9, 1962, Ser. No. 172,263
1 Claim. (Cl. 264—321)

This invention relates to a method for finish shaping foamed plastic, and more particularly to finishing pre-extruded foamed plastic into lengths of uniform, predetermined cross-sectional shape and size.

This invention is particularly concerned with the forming of expanded or foamed thermo-plastics of the type characterized by having low melting points and closed cellular construction, having a closed, non-porous skin-like outer surface, such as foamed polyethylene and foamed polystyrene and the like. These plastics are conventionally manufactured by extrusion processes in standard lengths and standard cross-sectional configurations. In the conventional extrusion processes used, the extruded plastic is highly inaccurate in cross-sectional size and shape so as to prevent its use for finished products which require dimensional accuracy. Hence, it becomes necessary to cut the extruded plastic to required size. Cutting has also been necessary where non-standard sizes and shapes are needed.

Thus, it is an object of this invention to provide a method for re-forming or finishing the above type of raw material, namely, extruded foamed plastic, into predetermined sizes and shapes which are highly accurate dimensionally.

A further object of this invention is to form such plastics into rod-like strips, which are dimensionally accurate and uniform in cross-section, by heat shrinking the raw material to finished size in a forming die wherein the strips are momentarily heated, increment by increment and without the application of pressure, thereby maintaining the characteristics of its outer skin-like surface and its closed cellular structure.

These and other objects and advantages of this invention will become apparent upon reading the following description, of which the attached drawings form a part.

Figure 1:
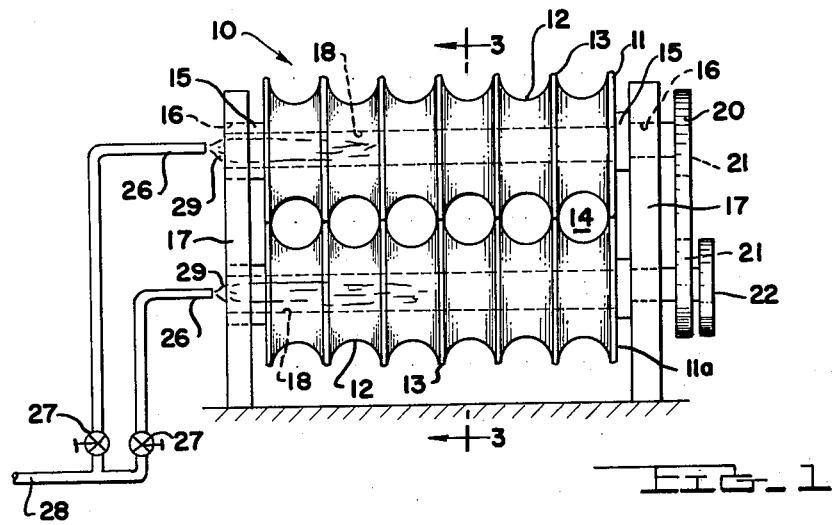
FIG. 1 is an elevational view of the apparatus herein.
Figure 2:
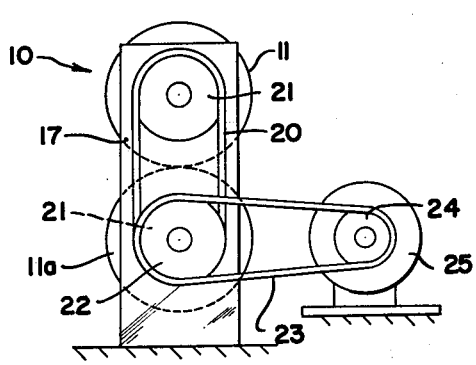
FIG. 2 is a side view thereof.
Figure 3:
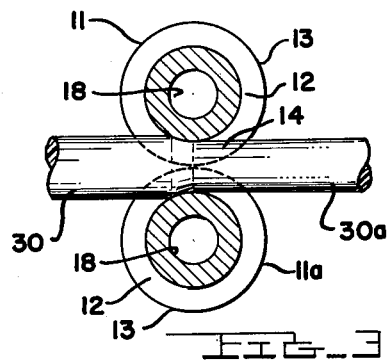
FIG. 3 is a cross-sectional view taken in the direction of arrows 3—3 of FIG. 1.
Figure 4:
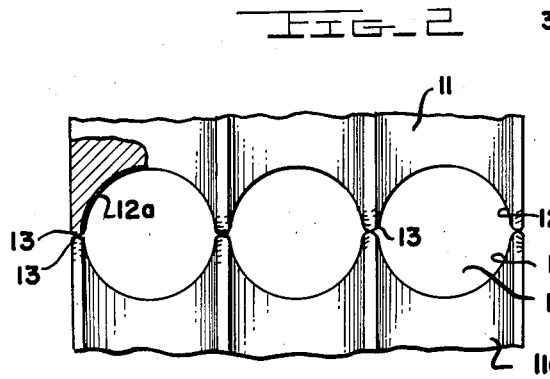

FIG. 4, an enlarged cross-sectional view of a portion of the rollers, shows the die throats.

Figure 5:
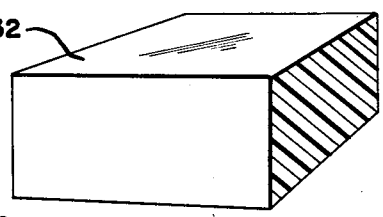

FIG. 5 illustrates one form of raw material, namely an extruded slab.

FIG. 6 illustrates finished rod-like strips formed from the slab illustrated in FIG. 5.

FIG. 7 is a view, similar to FIG. 4 showing modified die throats.

FIG. 8 illustrates a second form of raw material, namely, an extruded rod-like strip, and FIG. 9 illustrates a finished strip formed from the raw material of FIG. 7.

FIG. 10 is a top view of a continuous slitting-finishing apparatus.

FIG. 11 is an elevational view of the apparatus of FIG. 10.

*The Method Generally*

Broadly, the method herein contemplates starting with a raw material in the form of long strips of extruded famed plastic material characterized by being of a type which has a closed cellular structure, a low melting point, and preferably a non-porous skin-like outer surface, such as foamed polyethylene or foamed polystyrene and the like. This raw material is rapidly passed through a heated die throat which is of the contour of the finished product desired, and which is heated to a point slightly above the melting point of the plastic. The raw material is cold, that is, at room temperature, when entered into the die throat and is momentarily heated to the point where it shrinks to the dimensions of the die throat, in the absence of die pressure, but merely by the application of heat. There is no displacement or elongation of material as in conventional extrusion. The rapid removal of the momentarily heated localized portion from the die throat maintains the dimensional stability thereof upon its leaving the die throat and thereby produces the finished desired cross-section.

In so forming the finished cross-section, the cellular structure, while shrunken in size to some extent, is maintained, without being broken down, and where there is an outer non-porous skin-like surface, it also is maintained, although shrunken in size. Thus, the finished product is of the desired cross-sectional shape and dimensional accuracy, without change, other than size, of its cellular structural characteristics, as contrasted with cutting which slices open the cellular structure and damages or removes the outer skin-like surface and as contrasted with pressure forming wherein the cells are compressed and deformed.

*The Apparatus*

The forming apparatus, generally designated as 10, comprises two parallel rollers 11 and 11a, each having a plurality of circumferential grooves 12 formed therein, the grooves being separated by lands 13 which are sharply rounded, as illustrated in FIG. 4. The grooves are preferably coated with a thin coating 12a of polytetrafluoroethylene, popularly known as "Teflon," which prevents the plastic from sticking to the rollers.

The lands 13 of the two rollers are closely adjacent and may touch each other or be closely spaced together as required. The opposite grooves are radially aligned to form die throats 14, wherein each roller thus forms one-half of a die.

The opposite ends of each roller are provided with shaft extensions 15 which fit within openings 16 in vertical support walls 17 for rotation of the rollers about their respective axes.

Each roller is provided with a central axially directed opening 18 extending its full length so that the rollers are in effect hollow.

The rollers are rotated in opposite directions, at the same rate of speed, by means of drive chain 20 interconnected with sprockets 12 fastened to one end of each of the shaft extensions. Roller 11a is provided with a second sprocket 22 which is connected by chain 23 to sprocket 24 attached to an electric motor 25 to thereby rotate both rollers simultaneously.

The rollers are heated, to a temperature which is slightly above the melting point of the plastic to be formed, by means of a gas flame. The flame is provided by gas nozzles or tubes 26 arranged opposite and adjacent to the open ends of each of the rollers and connected through valves 27 to a gas supply line 28. Each nozzle directs a gas flame 29 through roller opening 18 to thereby uniformly heat the interior of the rollers. Each roller is made of a heat conductive, metal material so that the rollers are both maintained at equal temperatures.

*Comparison of Raw Material to Finished Article*

FIG. 8 illustrates a cross-sectional view of one form of raw material which is a standard size, extruded rod-like strip 30. Because of the limitations inherent in conventional extrusion processes, the strip is not completely uniform in cross-section or accurate in size and shape.

FIG. 9 illustrates a finished rod-like strip 30a which is circular in cross-section, is accurate in desired dimensional size and shape, and is slightly smaller in cross-section than the raw material of FIG. 7.

FIG. 4 illustrates a second form of raw material, in the form of a thick slab or strip 32. The strips are passed through the die throats to form a finished product in the form of circular, rod-like strips 34 which are interconnected by thin, rounded flashings 35.

Operation

In operation, considering first the raw material 30 shown in FIG. 8, one or several strips at a time are fed through the die throats 14 at a rapid rate of speed. This may be done manually by simply pushing the raw material into the die throat. The raw material is cold, that is, at room temperature, before entering the die throat.

Simultaneously, the dies or rollers are rotated at the pre-determined rate of speed for passing the plastic through and are heated by means of the gas flames 29 to a temperature slightly above the melting point of the plastic. For example, foamed polyethylene melts at about 190° to 195° F. and therefore the rollers will operate satisfactorily at a temperature of about 225° F. The exact temperature and the exact rate of speed of passing the material through the rollers can best be determined by trial and error tests, to thus produce the precisely dimensioned finished product.

The portion of the plastic in the die throat is momentarily heated to the point where it shrinks to the contours of the die throat, in this case, circular. As it quickly emerges from the die throat, it immediately is cooled sufficiently by air to maintain its dimensional stability.

With reference to FIGS. 5 and 6, the raw material here is a thick slab 32 which is slightly thicker than the thickness of the finished product. The slab is then moved through the die throats, and in this case, the rollers are arranged so that their lands 13, while closely adjacent, are not touching, so that the portion within the die throats are momentarily heated and shrunk into the configuration of the die throats, namely, a plurality of rods 34 which are interconnected by thin, rounded flashings 35. The flashings are sufficiently thin to be extremely fragile and require only a minute force to break and thereby to separate the rods.

The momentary heating of the strips causes its outer surface to fuse into a thin, closed cell, skin which is desirable as a protective coating for the open cell interior. The skin prevents water penetration, damage to the cellular structure, and stiffens the finished product, etc.

Modified Die Throat

FIG. 7 shows modified die throats 38 wherein the lands 39 between the roller grooves are flat and touch. This form is preferable where the raw material is already in strip form, as in FIG. 8.

Continuous Slitting-Finishing Apparatus

FIGS. 10 and 11 illustrate a continuous slitting-finishing apparatus for continuously forming slabs or strips into slit rods which are then passed through the die throats to form finished rods. In this apparatus the slab 32 passes through a slitter 40, consisting of a number of rotary blades or wheels 41 mounted upon an axle for continuous rotation and pressing against a base 42 over which the slab passes, and is slit into rods. These rods pass through a guide 43 then between rollers 11 and 11a of forming apparatus 10.

Thereafter, the now finished rods pass between crushing rollers 44 which are resilient rollers which apply light pressure to the rods to break up the stiffness of the skin and make it more pliable. The crushing rollers may be omitted where pliability or flexibility is not needed. With this apparatus, the finished strip is continuously produced.

This invention may be further developed within the scope of the following attached claim. Accordingly, it is desired that the foregoing description be read as being merely illustrative of an operative embodiment of this invention and not in a strictly limiting sense.

I now claim:

A method for finish shaping an elongated raw stock strip formed of a foamed thermoplastic of a type characterized by having a low melting point and a closed cellular structure into a very slightly smaller but finished shaped strip, in a die formed of two axially parallel rollers which are mounted for rotation about their axis and are arranged so that their circumferences are closely adjacent, and each having a peripheral groove, the two grooves being radially aligned to form a die throat of an annular formation to substantially completely surround the material passing through the die throat and with the axis of the die throat being perpendicular to the axes of the rollers comprising the steps of heating the rollers to a point slightly above the melting point of the plastic material, then rapidly passing an original shape strip, while cold, and of only slightly greater cross sectional area than the die throat, and in the absence of pressure, through the die throat at a uniform rate of speed at which the heat of the rollers momentarily and superficially heat the portion of the strip located in the die throat and shrinks it slightly into the finished cross-section of the die throat, while simultaneously rotating both rollers in the direction of travel of the strip through the die throat and at substantially the same peripheral speed as the speed of the strip.

References Cited in the file of this patent

UNITED STATES PATENTS

| | | |
|---|---|---|
| 2,722,719 | Altstadter | Nov. 8, 1955 |
| 2,878,153 | Hacklander | Mar. 17, 1959 |
| 2,994,110 | Hardy | Aug. 1, 1961 |

FOREIGN PATENTS

| | | |
|---|---|---|
| 707,818 | Great Britain | Apr. 21, 1954 |